E. P. LYNCH.
CULTIVATOR.
No. 94,903. Patented Sept. 14, 1869.
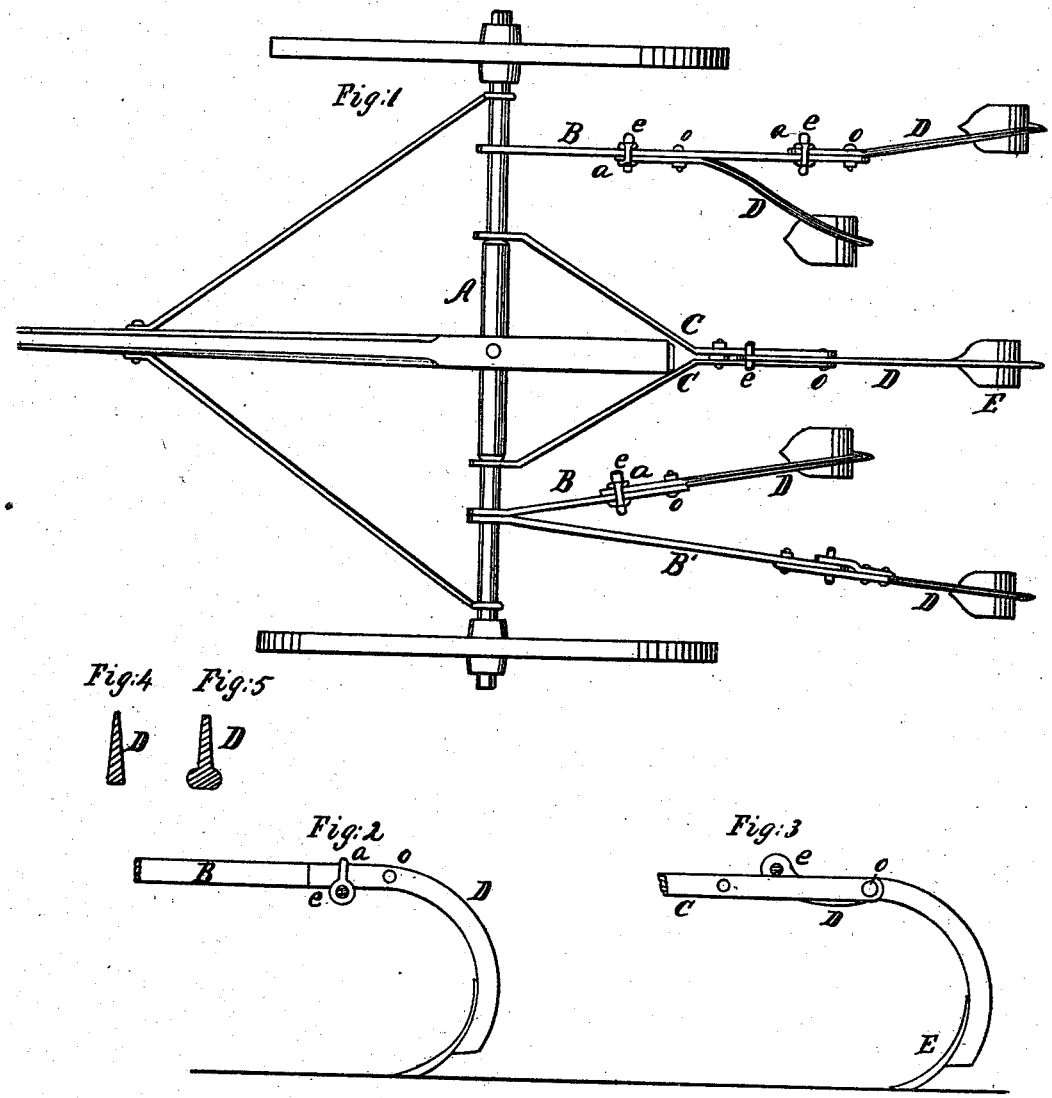

UNITED STATES PATENT OFFICE.

EDWARD P. LYNCH, OF DAVENPORT, IOWA.

IMPROVEMENT IN CULTIVATORS.

Specification forming part of Letters Patent No. 94,903, dated September 14, 1869.

*To all whom it may concern:*

Be it known that I, EDWARD P. LYNCH, of Davenport, in the county of Scott and State of Iowa, have invented certain new and useful Improvements in Cultivators; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to cultivators; and it consists in a novel manner of constructing and arranging the shovel-beams, as hereinafter explained.

Figure 1 is a top plan view of a so-called "walking-cultivator" with my improvements applied thereto. Figs. 2, 3, 4, and 5 are views of portions shown in detail.

My improvements are applicable in part, if not in whole, to both riding and walking cultivators, though more especially intended for the latter.

In the accompanying drawings, A represents the axle of a two-wheeled walking-cultivator, which instruments, as usually made, are provided with four shovels, two on each side.

My first improvement consists in providing and attaching to such a cultivator a central or extra shovel, E. This shovel I attach, like all the others, to curved beams D, which I pivot, by a bolt, $o$, to the rear end of two bars, C, which have their rear ends running parallel for some little distance, with sufficient space between them for the front end of beam D to play loosely therein, as represented in Fig. 1, the bars C diverging as they pass forward until they reach the axle, to which they are pivoted, one on each side. The front end of the beam D is curved upward, as represented in Fig. 3, and has a hole made through it laterally, through which is inserted a wooden pin, $e$, resting on the top of the bars C. When thus arranged, it will be seen that as the instrument is backed the front end of the beam is left free to rise, and thus save the pin from injury, and that as the cultivator moves forward, and the shovel comes in contact with a root or stone, the pin $e$ will break, thus allowing the shovel to yield, and saving the shovel and beam from injury. I also make the other beams jointed, but in a different manner. The right-hand gang consists of two shovels, both having their curved beams D pivoted by a bolt, $o$, to the horizontal bar B. At the front end of the beams D, and some little distance in front of the bolt $o$, I place a clip or small clevis, $a$, in such a manner as to rest on the bar B, and pass down on each side of it and the bar D, even with their under edge, where a wooden pin, $c$, is inserted through the eyes of the clip, and passing under the bars B and D, as shown in Figs. 1 and 2. In this case the front end of the shovel-beam D is held tight, and cannot turn up, as in the former instance, but the pin $c$ will break and release it, when a strain is brought on the shovel, the same as before. The beams D of the gang, on each side, may both be pivoted to one bar B, as shown at the right-hand side; or they may be connected to separate beams B and B', as represented on the opposite side.

Instead of being secured to the beams B in either of the methods above described, there may be a piece riveted or welded to the side of the bar B, and bent out so as to leave a space for the front end of the beam D to play in, or reversed, as shown on the left-hand bar B', the bar with its piece thus forming a bearing on each side of the front end of the beam D, to hold it in place and prevent lateral displacement, and also for the pin $e$ to bear upon the same as in case the two bars C are used. In any case, whichever style may be used, I make the beams D of wrought-iron bars, which are rolled or otherwise made thicker on their lower than on their upper edges. This may be done in either of the forms represented in Figs. 4 and 5; though the latter is the form preferred. By this means I obtain the requisite strength with less than the usual weight or amount of metal.

As the middle shovel, E, is hinged to the axle entirely independent of the others, it can be used with them, as occasion may require, and when not required may be raised clear from the ground and suspended from the rear projecting end of the tongue, or it may be detached entirely in those cases where it is not needed. By this method of jointing the beams and using the wooden pin and making the beams of the peculiar-shaped bar, and by adding the fifth or middle shovel, I produce an implement that is light and strong, and that is adapted to a great variety of work on the farm.

Having thus described my invention, what I claim is—

1. A walking-cultivator having the central or fifth shovel applied thereto substantially as described.

2. The combination of the bars C and the beam D, the latter being curved as shown, and secured to the former by the bolt o and pin e, as set forth.

3. Securing the beam D to the bar B by means of the bolt o and clip a with the pin e, as described.

4. Constructing the beams of cultivators of wrought-iron bars made thicker on their lower edges, as herein shown and described.

EDWARD P. LYNCH.

Witnesses:
 JOHN C. BLISS,
 W. L. CARROLL.